(12) United States Patent
Arnold et al.

(10) Patent No.: US 7,221,370 B1
(45) Date of Patent: May 22, 2007

(54) ADAPTIVE CONTENT DELIVERY

(75) Inventors: Greg Arnold, Sunnyvale, CA (US); Fermin Soriano, Sunnyvale, CA (US)

(73) Assignee: Palmsource, Inc., Sunnyvale, CA (US)

( * ) Notice: Subject to any disclaimer, the term of this patent is extended or adjusted under 35 U.S.C. 154(b) by 405 days.

(21) Appl. No.: 09/771,265

(22) Filed: Jan. 26, 2001

(51) Int. Cl.
*G09G 5/00* (2006.01)

(52) U.S. Cl. .............. 345/581; 345/169; 709/228; 709/246; 715/740; 715/744; 715/745

(58) Field of Classification Search .......... 345/740, 345/744, 745, 169, 581; 709/246, 228, 236; 715/744, 745, 740
See application file for complete search history.

(56) References Cited

U.S. PATENT DOCUMENTS

| | | | |
|---|---|---|---|
| 6,490,627 B1 * | 12/2002 | Kalra et al. ............... | 709/231 |
| 6,560,604 B1 * | 5/2003 | Fascenda ................. | 707/10 |
| 6,618,763 B1 * | 9/2003 | Steinberg ................ | 709/246 |
| 6,654,814 B1 * | 11/2003 | Britton et al. ........... | 709/246 |
| 6,704,024 B2 * | 3/2004 | Robotham et al. ....... | 345/581 |
| 6,763,388 B1 * | 7/2004 | Tsimelzon .............. | 709/228 |

* cited by examiner

*Primary Examiner*—Kimbinh T. Nguyen
(74) *Attorney, Agent, or Firm*—Berry & Associates P.C.

(57) ABSTRACT

A method and apparatus that provides adaptation in the content delivered to a palmtop computer. Connections between a palmtop computer and the Internet can vary from low speed dial-up to very high speed. Also, a palmtop computer's display, memory and processing power can vary considerably. Communication with the Internet is generally through a proxy server that can deduce these considerations from the palmtop computer's serial number and/or other information specified by user. The proxy server can then adapt the content based upon these considerations (e.g. only send two bit gray scale images to non-color palmtop computer; only send first frame of animated gif to low processing power palmtop computer, etc.).

20 Claims, 7 Drawing Sheets

ADAPTIVE CONTENT DELIVERY

FIELD OF THE INVENTION

The present invention relates to the field of adaptive content delivery and in particular to adaptive content delivery to a palmtop computer.

BACKGROUND

As the components required to build a computer system have reduced in size, new categories of computer systems have emerged. One of the new categories of computer systems is the "palmtop" computer system. A palmtop computer system is a computer that is small enough to be held in the hand of a user and can be "palm-sized." Most palmtop computer systems are used to implement various Personal Information Management (PIM) applications such as an address book, a daily organizer and electronic notepads, to name a few.

While these palm sized computers ("palmtop" computers) have dramatically reduced size when compared to a desktop or notebook computer, the user would like to be able to perform many of the same types of functions, such as accessing content on the Internet, performed using physically larger and more powerful computers. The existing infrastructure (e.g., the Internet) has a wealth of content that the users of palmtop computers wish to access, but since this infrastructure was developed for more powerful computers, it is often difficult for users of palmtop computers to readily take advantage of the content available. Moreover, the existing palmtop computers have varying levels of processing power, communication power, display power and other attributes. As this class of computer evolves, such attributes will be ever changing as the technology permits greater power, more memory, and better display capabilities. There is currently no way to adapt the content to the growing power available in palmtop computers.

SUMMARY OF THE INVENTION

Accordingly, what is needed is a system with the ability to adapt to the varying capabilities of palmtop computers and connection methods as they evolve.

A method and apparatus that provides adaptation in the content delivered to a palmtop computer. Connections between a palmtop computer and the Internet can vary from low speed dial-up to very high speed. Also, a palmtop computer's display, memory and processing power can vary considerably. Communication with the Internet is generally through a proxy server that can deduce these considerations in any number of ways. The proxy server can then adapt the content based upon these considerations (e.g. only send two bit gray scale images to non-color palmtop computer; only send first frame of animated gif to low processing power palmtop computer, etc.). This provides an advantage of matching the capabilities of the palmtop computer with the richness of the content delivered to optimize the transmission time and processing power required to enhance the user's experience.

A method of adapting content for transmission to a palmtop computer consistent with an embodiment of the invention includes: receiving an identifier from the palmtop computer; determining a profile for downloading information to the palmtop computer; and adapting content to be transmitted to the palmtop computer based upon the profile.

A method of adapting content for transmission to a palmtop computer consistent with an embodiment of the present invention includes: receiving an identifier from the palmtop computer, the identifier comprising a serial number and a request header transmitted from the palmtop computer; determining a processing power for a processor residing within the palmtop computer by reference to the identifier; determining a display resolution parameter and a display color handling ability for a display of the palmtop computer by reference to the identifier; determining a display parameter for a display of the palmtop computer by reference to the identifier; determining an amount of memory available to the palmtop computer from the identifier; determining a data transmission format; determining a transmission speed for transmission to the palmtop computer; selecting a profile for downloading information to the palmtop computer; and adapting content to be transmitted to the palmtop computer based upon the profile.

A storage medium storing instructions which, when executed on a programmed processor, carry out a process consistent with embodiments of the present invention of adapting content for transmission to a palmtop computer includes: receiving an identifier from the palmtop computer; determining a profile for downloading information to the palmtop computer; and adapting content to be transmitted to the palmtop computer based upon the profile.

The above summaries are intended to illustrate exemplary embodiments of the invention, which will be best understood in conjunction with the detailed description to follow, and are not intended to limit the scope of the appended claims.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

NOTATION AND NOMENCLATURE

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

ADAPTIVE CONTENT DELIVERY IN ACCORDANCE WITH THE PRESENT INVENTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Figure 1:
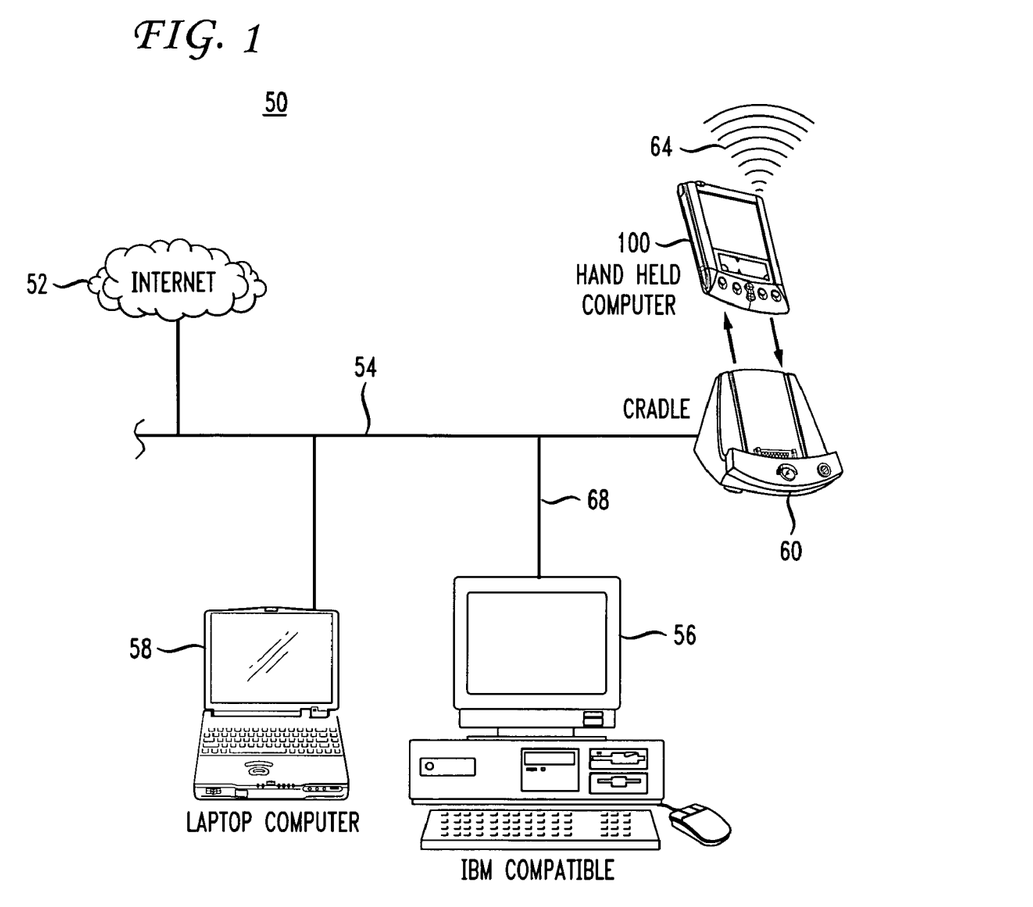
FIG. 1 is system illustration of a palmtop computer system connected to other computer systems and the Internet via a cradle device.

FIG. 1 illustrates a system 50 including a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Bus 54 is also coupled to a cradle 60 for receiving and initiating communication with a palmtop ("palm-sized") portable computer system 100 of the present invention. Cradle 60 provides an electrical and mechanical communication interface between bus 54 (and anything coupled to bus 54) and the computer system 100 for two way communications. Computer system 100 also contains a wireless infrared communication mechanism 64 for sending and receiving information from other devices.

Figure 2A:
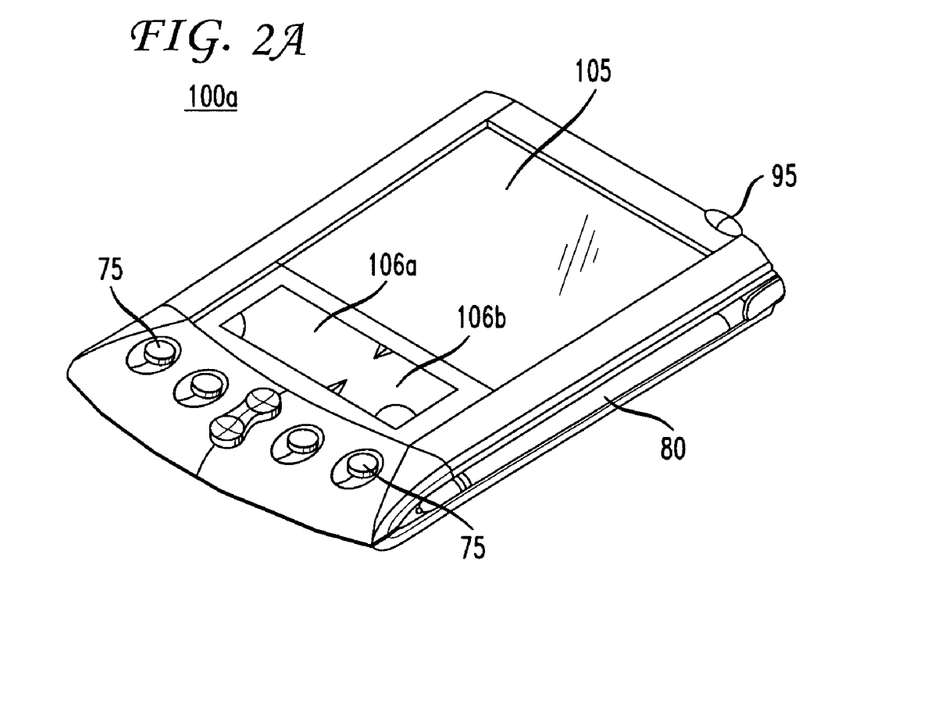
FIG. 2A is a top side perspective view of a palmtop computer system that can be used as a platform for data entry.

FIG. 2A is a perspective illustration of the top face 100a of one embodiment of the palmtop computer system of the present invention. The top face 110a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2A also illustrates a handwriting recognition pad or "digitizer" containing two regions 106a and 106b. Region 106a is for the drawing of alphabetic characters therein for automatic recognition and region 106b is for the drawing of numeric characters therein for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 2B:
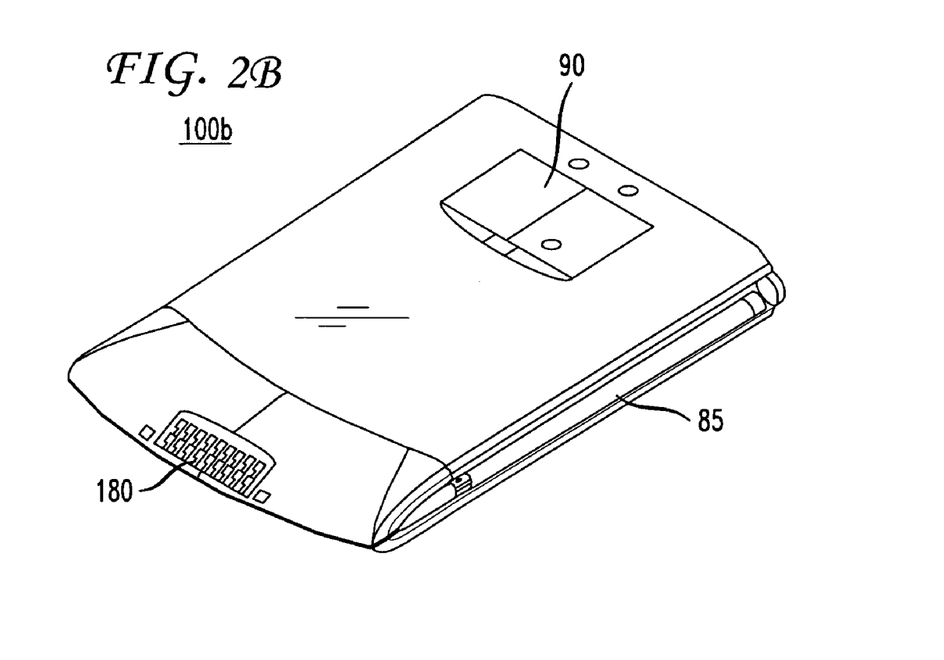
FIG. 2B is a bottom side perspective view of the palmtop computer system of FIG. 2A.

FIG. 2B illustrates the bottom side 100b of one embodiment of the palmtop computer system of the present invention. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, USB (Universal Serial Bus), etc. In addition to providing the serial interface, some versions of palmtop computers consistent with the present invention include charging terminals for charging internal batteries through the cradle connection at interface 108. Accordingly, interface 108 typically comprises approximately ten to twelve electrical connector terminals.

Figure 3:
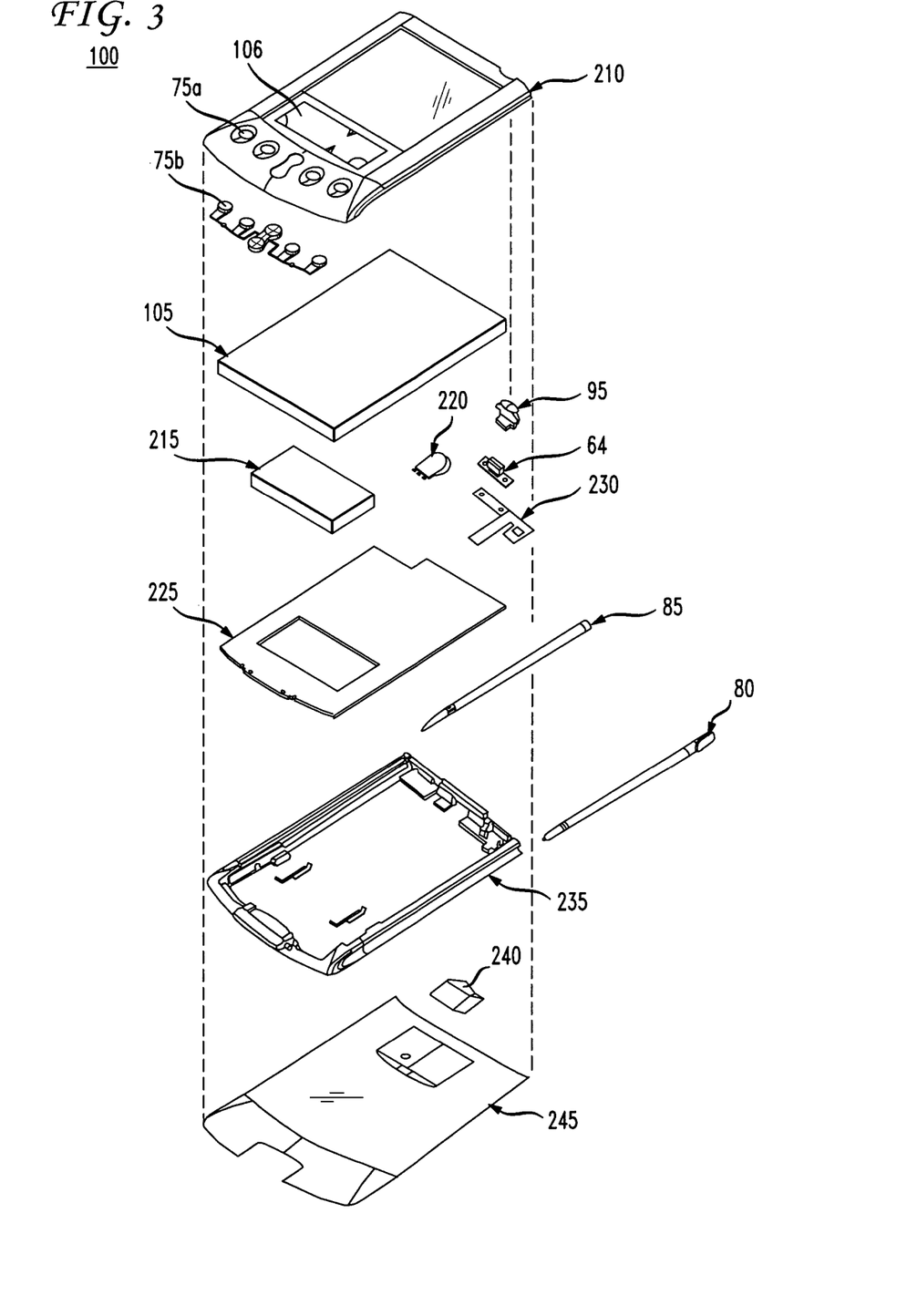
FIG. 3 is an exploded view of the components of the palmtop computer system of FIG. 2A.

FIG. 3 is an exploded view of the palmtop computer system 100 in accordance with one implementation. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., LCD, FED, plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A midframe 235 is shown along with stylus 80. Position adjustable antenna 85 is shown.

A radio receiver/transmitter device 240 is also shown between the midframe and the rear cover 245 of FIG. 3. The receiver/transmitter device 240 is coupled to the antenna 85 and also coupled to communicate with the PC board 225. In one implementation the Mobitex wireless communication system is used to provide two way communication between system 100 and other networked computers and/or the Internet via a proxy server.

Figure 4:
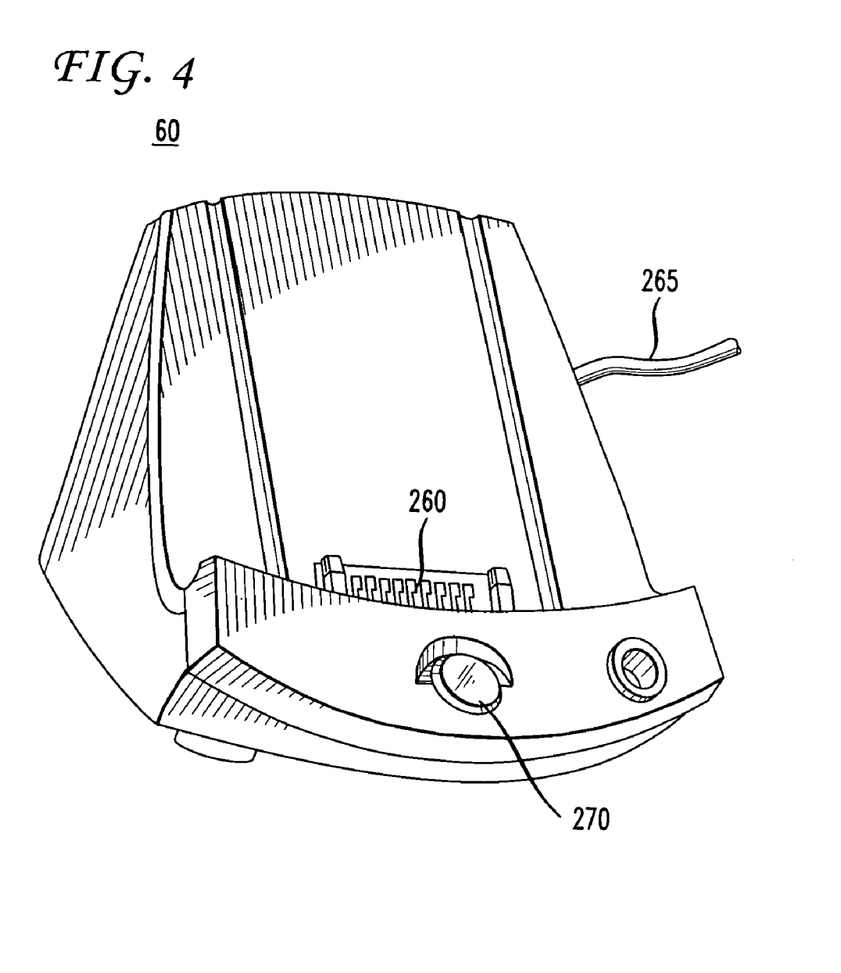
FIG. 4 is a perspective view of the cradle device for connecting the palmtop computer system to other systems via a communication interface.

FIG. 4 is a perspective illustration of one embodiment of the cradle 60 for receiving the palmtop computer system 100. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication 265.

Figure 5:
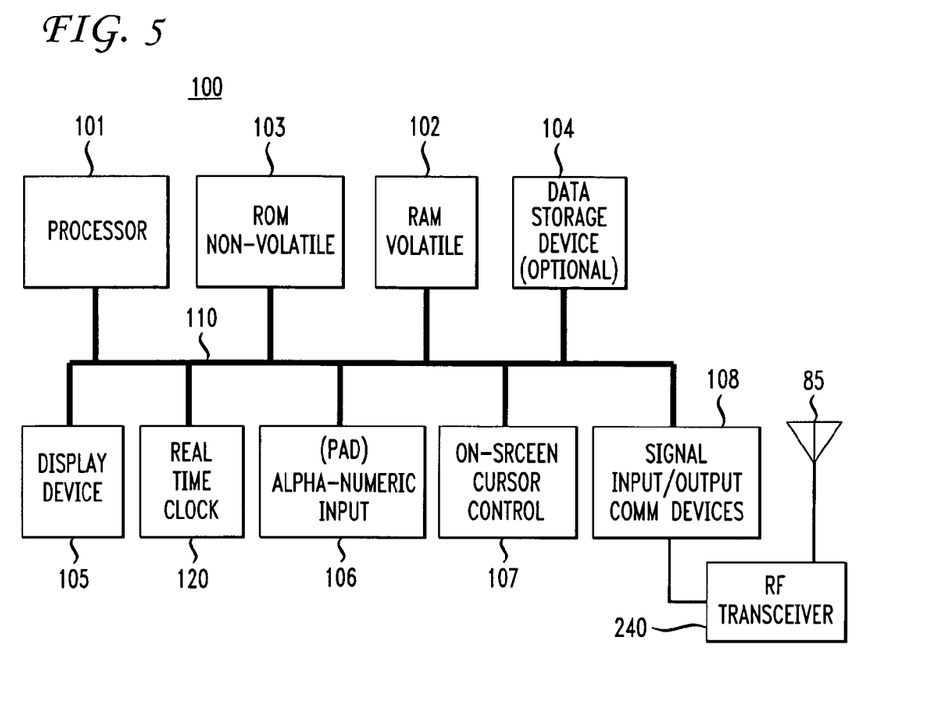
FIG. 5 is a logical block diagram of the palmtop computer system in accordance with an embodiment of the present invention.

FIG. 5 illustrates circuitry of computer system 100, some of which can be implemented on PC board 225. Computer system 100 includes an address/data bus 100 for communicating information, a central processor 101 coupled with the bus for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. Computer system 110 also includes an optional data storage device 104 (e.g., memory stick, SD memory, etc.) coupled with the bus 100 for storing information and instructions. Device 104 can be removable. As described above, system 100 also contains a display device 105 coupled to the bus 100 for displaying information to the computer user. PC board 225 can contain the processor 101, the bus 100, the ROM 103 and the RAM 102.

Also included in computer system 110 of FIG. 5 is an optional alphanumeric input device 106 which in one implementation is a handwriting recognition pad ("digitizer") having regions 106a and 106b (FIG. 2A), for instance. Device 106 can communicate information and command selections to the central processor 101. System 110 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact. The display device 105 utilized with the computer system 110 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display.

Signal communication device 108, also coupled to bus 100, can be a serial port for communicating with the cradle 60. Device 108 can also include an infrared communication port.

Figure 6:
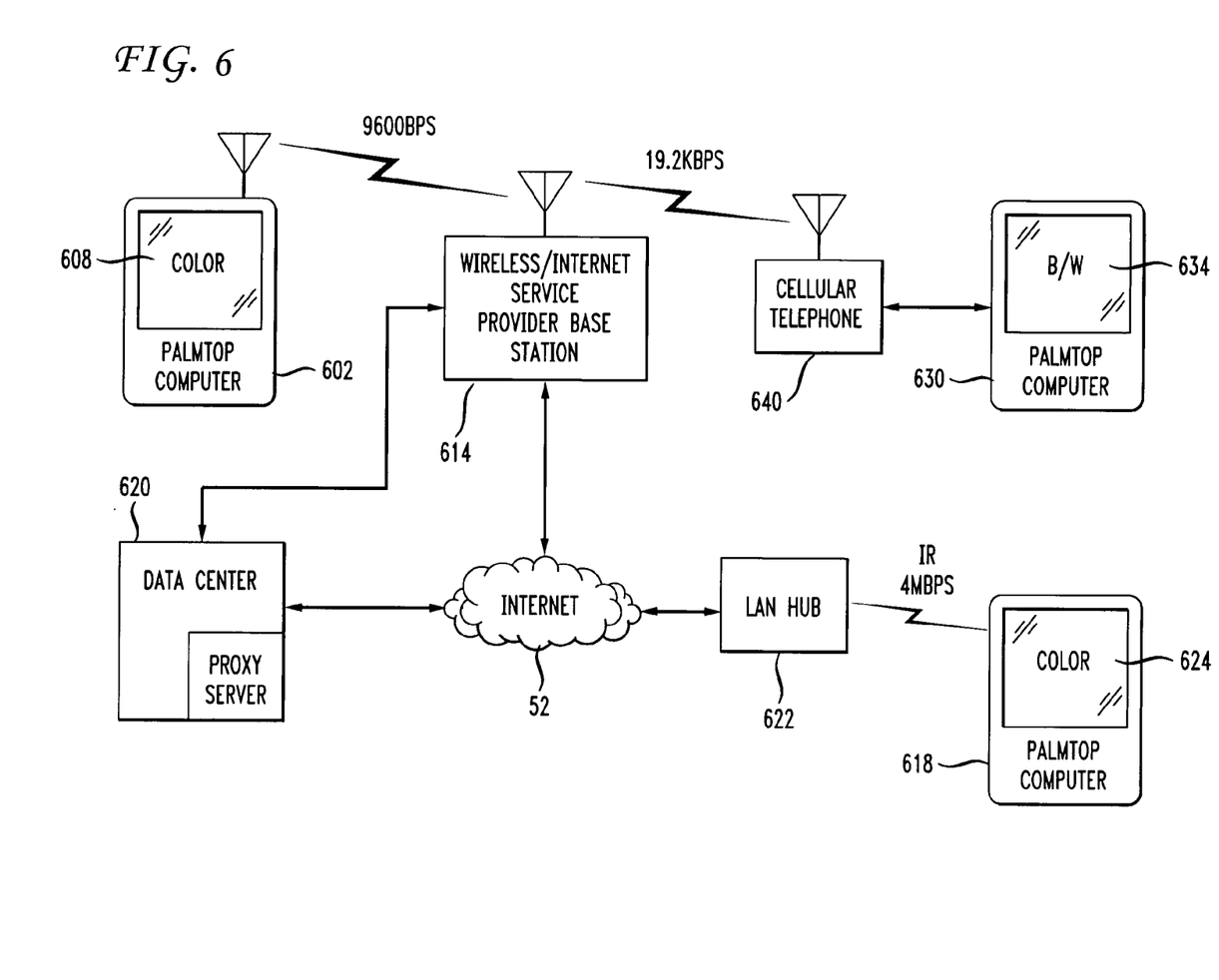
FIG. 6 illustrates several possible communication and display capabilities in palmtop computers communicating with the Internet.

Referring now to FIG. 6, a plurality of Palmtop Computers are illustrated interacting with a wireless or wired data network. In this figure, palmtop computer 602 having color display 608 communicates via its antenna with one of a plurality of base stations 614 comprising a network of such base stations of a wireless/Internet service provider. Each of the base stations 614 is connected to a data center 620, either directly or via the Internet 52. In addition, data center 620 is connected to the Internet 52 which places all of the capabilities of the Internet and the World Wide Web at the disposal of the data center 620.

The data center 620 can provide a number of services to palmtop computers including a service called "Web clipping" via a Web clipping proxy server within the data center 620. "Web clipping" is a process by which a palmtop computer can effectively provide Internet services to the user within its environment of limited communication bandwidth, limited memory, limited display and limited processing capabilities. The concept of Web clipping is based on a principal of minimizing the amount of information that is communicated to and from palmtop computer. That is, the less data transferred the more efficient the communication system. The query is then submitted to the data center 620 in the form of a very small message (typically less than 50 bytes).

The data center 620 serves as an interface to the Internet 52 which pulls the desired information from the Internet and returns a response to the palmtop computer in a response which is typically less than 500 bytes (compressed). As a result, the user is able to quickly obtain the information desired from a particular Web page and display Web pages on the varying resolution display of palmtop computers. Web clipping is described in greater detail in U.S. patent application Ser. No. 09/087,515 Filed May 29, 1998 entitled "Method and Apparatus for Communicating Information Over Low Bandwidth Communications Network", naming Hawkins et al. This application is hereby incorporated by reference.

This approach has the benefits of providing near instant access to the Internet while simultaneously providing low cost of service by controlling the airtime usage. This in turn results in long battery life since transmissions from palmtop computer may be a substantial drain on batteries.

The Web clipping proxy server in data center 620 is responsible for converting standard Internet protocols and content from a Web page into a form that is tuned for transmission across a wireless network and for display on a very thin client device such as a palmtop computer. The Web clipping proxy server uses standard Internet and security protocols (TCP, HTTP and SSL) to HTML servers to insure compatibility. However, on the wireless side, it adjusts everything to support extremely low bandwidth and latency. Moreover, the Web clipping proxy server compresses the data from the Internet to insure maximum transmission efficiency in the wireless environment. Data center 620 having Web clipping proxy server is currently implemented for the commercially available Palm VII wireless palmtop computer system as a service called Palm.net™ operated by Palm Computing, Inc.

Web clipping has been found to be a very effective method for providing Internet content to users of palmtop computers. However, as the abilities of such palmtop computers evolve, their ability to deal with more complex content needs to be addressed so that the user can enjoy a richer experience with using content from the Internet 52 or other sources. In the example shown in FIG. 6, palmtop computer 602 has the ability to communicate at 9600 BPS via its wireless communication capabilities and has a color display. However, consider palmtop computer 618 also having a color display 624 and a high speed 4 MBPS infrared connection to the Internet 52 through LAN hub 622. Obviously, this palmtop computer could potentially receive data at a much higher rate and, providing palmtop computer 618 has the available processing power, memory, etc., it could deal with a greater inflow of information without annoying the user with unnecessary delays than that of palmtop computer 602.

Palmtop computer 630 includes a monochrome display 634 and is connected at a higher communication rate of 19.2 KBPS through cellular telephone 640 than the communication rate of palmtop computer 602, but at a lower rate than that of palmtop computer 618. Depending upon the processing power of the palmtop computers' internal CPU, the amount of memory, connection speed, display type, display resolution, connection speed, etc., it would be desirable to adapt the content delivered to the palmtop computer to obtain a good compromise of performance speed versus richness of content.

Figure 7:
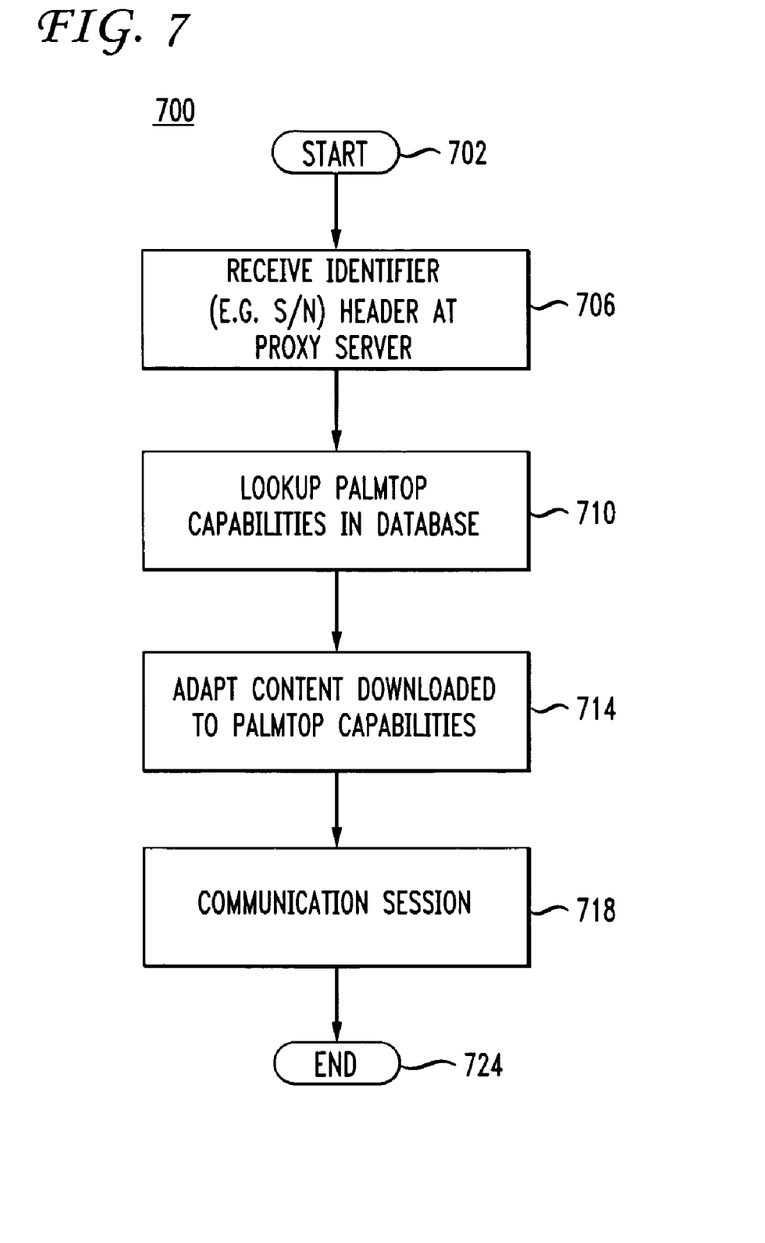
FIG. 7 is a flow chart illustrating an embodiment of the present invention.

Referring now to FIG. 7, a high level flow chart of a process 700 illustrates an embodiment consistent with the present invention to provide adaptive content delivery starting at 702. At 706, an identifier is received by the proxy server at data center 620. In the preferred embodiment, this identifier may include the serial number of the palmtop computer itself. In other embodiments, a header may be transmitted as the identifier or in addition to the identifier, with the header including information such as an amount of RAM memory in the palmtop computer or other relevant parameters. In other embodiments, the header may simply designate a class of palmtop computer that identifies the general capabilities of the palmtop computer. Many variations of such identifiers can be devised by those skilled in the art.

The palmtop computer's abilities are looked up in a database at 710 by the identifier (or header information) so that the palmtop computer's characteristics can be determined. The palmtop computer's capabilities can be determined in any number of ways (e.g. by serial number, model number, device type, etc. as shown in TABLE 3). Such data can be automatically delivered in a web clipping request packet and used as a key to the database at 701. Connection speed can be stored in the database, but is preferably determined dynamically, for example, by measuring round trip time for a so-called "ping" request or querying the wireless network provider. If the palmtop computer is manufactured by a provider of services to the data center 620, the serial number or other identifier can be used to look up relevant information needed to determine the capabilities of the palmtop computer. Otherwise, the header information can be formatted to contain all needed information. At 714, once the data center knows the abilities of the palmtop computer, the content can be adapted to the abilities of the palmtop computer during the ensuing communication session at 718 by conforming the adaptation process to a particular profile suitable to the palmtop computer at hand. The process ends at 724 when the communication session is terminated.

The adaptation process of 714 can take many forms depending on the nature of the capabilities of the palmtop computer. Thus, the exemplary embodiments described as follow are merely intended to be illustrative of the principles of the present invention and not limiting to the scope of the invention. Consider, for example, a palmtop computer having comparatively low processing power, connected by a low speed connection, having a monochrome low resolution display. Such a palmtop computer might be consistent with a first generation of palmtop computers which are currently still widely in use. In general, it is desirable to minimize the amount of data communicated with such palmtop computers due to their limited processing power, display capabilities and connection speed. Thus, for example, Internet content with high resolution, rich colors (e.g., 32 bit color resolution) and animated GIF icons would be annoying to the user due to the large download time. Moreover, receiving and processing such content could rapidly drain the batteries of such a palmtop computer. Accordingly, it is advantageous that the content be matched to the palmtop computer's abilities. Thus, such content can be processed by converting color images to lower resolution two bit gray scale images that require less data and processing power to generate. Additionally, animated GIF icons can be truncated so that only the first frame of the icon is transmitted to eliminate the animation but give the user a usable icon, further reducing the amount of data and processing power required.

As described above, this can be accomplished by reference to information stored in a table such as TABLE 1 below in the data center 620. Many variations in the content of TABLE 1 are possible without departing from the invention. In this exemplary case, the palmtop computer of interest might correspond to serial number 123456. The connect speed shown and data format (e.g., Mobitex or CDMA), can be deduced from the incoming communication from the palmtop computer or can be a registered parameter. It is noted that for this exemplary embodiment, the various attributes of the palmtop computers may be classified coarsely as shown (e.g., low and high, monochrome and color). Such coarse designations may be adequate to determine how to adapt the content, however, this is not to be limiting since these attributes can be more exactly defined (e.g., processing power in MIPS, etc., connection speed in KBPS, etc.) without departing from the invention.

TABLE 1

| Serial Number | Display Type | Display Resolution | CPU Power | Connect Speed (may be dynamically deduced) |
|---|---|---|---|---|
| 123456 | Monochrome | Low | Low | Low |
| 234567 | Color | Low | Low | Low |
| 345678 | Monochrome | Low | Low | Low |
| 456789 | Monochrome | High | High | Low |
| 567890 | Color | High | High | High |

In the example above, the content is adapted according to parameters designed to suit the palmtop computer of interest. In TABLE 2 below, the parameters used for transmitting content to the palmtop computer is illustrated. Thus, TABLE 2 is used to determine an appropriate profile for carrying out the adaptation.

TABLE 2

| Serial Number | Animated GIF | Color | Audio Sample rate | Display Resolution |
|---|---|---|---|---|
| 123456 | First frame | 2 bit grey | Low | Low |
| 234567 | First frame | 8 bit color | Low | Low |
| 345678 | First frame | 2 bit grey | Low | Low |
| 456789 | First frame | 4 bit grey | High | High |
| 567890 | Yes | 16 bit color | High | High |

Now consider palmtop computer serial number 567890. This palmtop computer has substantially greater capabilities than that previously described. In this case, animated GIF icons and other images can be handled by the higher processing power of the CPU. Moreover, higher resolution color images (that take large amounts of data to describe) can be handled reasonably as 16 bit color images with higher resolution due to the higher processing power, richer display and higher connect speed.

In an alternative to the examples given above, a set of classes of palmtop computers can be established so that the identifier transmitted by the palmtop computer might need to only be a designation of class. In this case, the class designation can carry with it all of the information necessary to carry out the appropriate adaptation by reference to a table such as TABLE 3 below to determine an appropriate profile for carrying out the adaptation. In still other embodiments, each relevant parameter can be transmitted as the identifier in the header to the proxy server without departing from the invention. It will be clear to those skilled in the art that the required information can be formatted to use a minimal amount of data so that the overhead required to implement the present invention is minimized.

TABLE 3

| Palmtop Class | Animated GIF | Color | Audio Sample rate | Display Resolution |
|---|---|---|---|---|
| 01 | First frame | 2 bit grey | None | Low |
| 02 | First frame | 8 bit color | Low | Low |
| ... | ... | ... | ... | ... |
| 99 | Yes | 32 bit color | High | High |

As previously described, the examples above are considered only as illustrative of the concept of the present invention. Optimization of the various parameters is needed to achieve the best compromise between processing and download time on one side and richness of content on the other. While this example uses only coarse measurements (e.g., high and low), the present invention contemplates use of more exact parameters. Moreover, many such parameters may be handled to optimize the present invention including memory, screen size, compression level, audio and video abilities, etc. It is contemplated that the present invention will be carried out using a programmed processor residing on the proxy server within the data center 620. Accordingly, the program instructions for carrying out the processes of the invention can be stored on any suitable electronic storage medium for processing on such server.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will also appreciate that the embodiments described above can be implemented using disc storage as well as other forms of storage including Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention is preferably implemented using a programmed processor executing programming instructions that are broadly described above in flow chart form and can be stored on any suitable electronic storage medium. However, those skilled in the art will appreciate that the processes described above can be implemented in any number of variations and in many suitable programming languages without departing from the present invention. For example, the order of certain operations carried out can often be varied, and additional operations can be added without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of adapting content for transmission to a palmtop or portable computer, comprising:
   receiving an identifier from the palmtop computer at a data center;
   accessing a table of data in conjunction with said identifier from the palmtop computer to select a profile for downloading information to the palmtop computer, said table of data comprising parameters characteristic of capabilities of said palmtop computer including resolution and color characteristics of a display of the palmtop computer; and
   adapting web content created through web clipping to be transmitted to the palmtop computer based upon the profile from said table of data.

2. The method according to claim 1, wherein the table of data in conjunction with said identifier from the palmtop computer further comprises a transmission speed for transmission to the palmtop computer.

3. The method according to claim 1, wherein the table of data in conjunction with said identifier from the palmtop computer comprises a processing power for a processor residing within the palmtop computer.

4. The method according to claim 1, wherein the table of data in conjunction with said identifier from the palmtop computer comprises a display parameter for a display of the palmtop computer.

5. The method according to claim 4, wherein the display parameter comprises the display's color handling ability.

6. The method according to claim 4, wherein the display parameter comprises the display's resolution.

7. The method according to claim 1, wherein the table of data in conjunction with said identifier from the palmtop computer comprises an amount of memory available to the palmtop computer.

8. The method according to claim 1, wherein the table of data in conjunction with said identifier from the palmtop computer comprises a data transmission format.

9. The method according to claim 1, wherein the adapting comprises transmitting only a first frame of an animated GIF.

10. The method according to claim 1, wherein the adapting comprises converting color images to a low resolution grey scale image.

11. The method according to claim 1, wherein the adapting comprises converting a digital audio signal with a first sampling rate to a digital audio signal with a second sampling rate, and wherein the second sampling rate is lower than the first sampling rate.

12. The method according to claim 1, wherein the identifier comprises a serial number.

13. The method according to claim 1, wherein the identifier comprises a request header transmitted from the palmtop computer.

14. The method according to claim 1, wherein said data center comprises a proxy server serving the palmtop computer.

15. A method of adapting content for transmission to a palmtop or portable computer, comprising:
- receiving an identifier from the palmtop computer, the identifier comprising a serial number and a request header transmitted from the palmtop computer;
- accessing a table of data in conjunction with said identifier, said table of data comprising:
  - a processing power for a processor residing within the palmtop computer by reference to the identifier;
  - a display resolution parameter and a display color handling ability for a display of the palmtop computer by reference to the identifier;
  - a display parameter for a display of the palmtop computer by reference to the identifier;
  - an amount of memory available to the palmtop computer by reference to the identifier;
  - a data transmission format; and
  - a transmission speed for transmission to the palmtop computer;
- selecting a profile for downloading information to the palmtop computer from said table of data in conjunction with said identifier, said profile adapted to minimize transmission of said information to the palmtop computer based on the characteristic parameters of the palmtop computer; and
- adapting web content created through web clipping to be transmitted to the palmtop computer based upon the profile from said table of data.

16. The method according to claim 15, wherein the adapting comprises transmitting only a first frame of an animated GIF.

17. The method according to claim 15, wherein the adapting comprises converting color images to a low resolution grey scale image.

18. The method according to claim 15, wherein the adapting comprises converting a digital audio signal with a first sampling rate to a digital audio signal with a second sampling rate, and wherein the second sampling rate is lower than the first sampling rate.

19. The method according to claim 15, wherein said method is carried out in a proxy server serving the palmtop computer.

20. A computer storage medium storing instructions which, when executed on a programmed processor, carry out a process of adapting content for transmission to a palmtop or portable computer, comprising:
- receiving an identifier from the palmtop computer;
- accessing a table of data in conjunction with said identifier from the palmtop computer to select a profile for downloading information to the palmtop computer, said table of data comprising parameters characteristic of capabilities of said palmtop computer including resolution and color characteristics of a display of the palmtop computer; and
- adapting web content created through web clipping to be transmitted to the palmtop computer based upon the profile from said table of data.

* * * * *